(12) United States Patent
Wundlechner et al.

(10) Patent No.: US 11,891,543 B2
(45) Date of Patent: Feb. 6, 2024

(54) BIO-BASED ADDITIVES BASED ON MICRONIZED RICE BRAN WAX

(71) Applicant: CLARIANT INTERNATIONAL LTD, Muttenz (CH)

(72) Inventors: Milena Wundlechner, Mertingen (DE); Simon Bodendorfer, Augsburg (DE); Philipp Kratzer, Wertingen (DE); Manuel Broehmer, Groebenzell (DE); Tobias Niederleitner, Westendorf (DE)

(73) Assignee: CLARIANT INTERNATIONAL LTD, Muttenz (CH)

(*) Notice: Subject to any disclaimer, the term of this patent is extended or adjusted under 35 U.S.C. 154(b) by 0 days.

(21) Appl. No.: 18/011,557

(22) PCT Filed: Jun. 18, 2021

(86) PCT No.: PCT/EP2021/066663
§ 371 (c)(1),
(2) Date: Dec. 20, 2022

(87) PCT Pub. No.: WO2021/259804
PCT Pub. Date: Dec. 30, 2021

(65) Prior Publication Data
US 2023/0272231 A1   Aug. 31, 2023

(30) Foreign Application Priority Data
Jun. 22, 2020 (EP) .................................. 20181497

(51) Int. Cl.
C09D 7/65    (2018.01)
C09D 7/40    (2018.01)
C09D 11/12   (2006.01)

(52) U.S. Cl.
CPC ............... C09D 7/65 (2018.01); C09D 7/69 (2018.01); C09D 11/12 (2013.01)

(58) Field of Classification Search
None
See application file for complete search history.

(56) References Cited

U.S. PATENT DOCUMENTS 9,249,365 B2    2/2016  Schneider
9,404,007 B2    8/2016  Leotsakos
9,447,279 B2    9/2016  Herrlich et al.
(Continued)

FOREIGN PATENT DOCUMENTS

CN    102046741 A    5/2011
CN    102227450 A    10/2011
(Continued)

OTHER PUBLICATIONS

Anonymous, Fließbettstrahlmühle, Fließbettstrahlmühle, Jan. 17, 2018, Internet, https://de.wikipedia.org/wiki/Fliessbettgegenstrahlmühle, Internet, XP055746647.
(Continued)

Primary Examiner — Colin W. Slifka
(74) Attorney, Agent, or Firm — Natali Richter

(57) ABSTRACT

The invention relates to rice bran wax oxidates that have optionally been derivatized and to micronized wax additives (MWAs) comprising optionally derivatized rice bran wax oxidate, having a volume-average particle size $d_{50}$ of between 1 and 50 µm, and to the production thereof and use thereof in printing inks, paints and coatings.

18 Claims, 7 Drawing Sheets

Gloss [ ] of flexographic printing ink 2 using the tested MWAs

(56) References Cited

U.S. PATENT DOCUMENTS

| | | | |
|---|---|---|---|
| 10,676,618 | B2 | 6/2020 | Broehmer et al. |
| 2012/0009423 | A1 | 1/2012 | Bach |
| 2015/0284661 | A1 | 10/2015 | Herrlich et al. |

FOREIGN PATENT DOCUMENTS

| | | | |
|---|---|---|---|
| CN | 104736203 | A | 6/2015 |
| DE | 102018116113 | A1 | 1/2020 |
| EP | 2643434 | B1 | 10/2016 |
| EP | 2909273 | B1 | 10/2016 |
| JP | 2010-020304 | A | 1/2010 |
| WO | 2012/069041 | A1 | 5/2012 |
| WO | 2014/060081 | A1 | 4/2014 |
| WO | 2014/060082 | A1 | 4/2014 |
| WO | 2014060405 | A2 | 4/2014 |
| WO | 2014/131514 | A1 | 9/2014 |
| WO | 2014/060081 | A8 | 12/2014 |
| WO | 2015/117757 | A1 | 8/2015 |
| WO | 2017/009408 | A1 | 1/2017 |

OTHER PUBLICATIONS

Anonymous, "High Performance Wax Additives", Apr. 1, 2018, Internet, http://www.micropowders.com/brochures/corporate-brochure.pdf, Internet XP055746599.

Anonymous, "High Performance Wax Additives", Apr. 1, 2020, Internet, http://www.micropowders.com/Files/brochures/8page.pdf, Internet XP055746593.

Anonymous, "Micronized rice bran wax (Podax), product data sheet", Jan. 1, 2020, Internet, https://www.podax.com.cn/en/sub-products/natural-wax-en/, Internet XP055746561.

Anonymous, "NatureFine R331 (Rice bran wax), product data sheet", Apr. 1, 2020, Internet, https://www.micropowders.com/Files/TDS/NatureFine%20R331%20TDS.pdf, Internet XP055746570.

Anonymous, Naturesoft 860R (Rice bran wax powder), product data sheet, Apr. 1, 2019, Internet, https://www.mpipersonalcare.com/Files/brochures/Naturesoft860R.pdf, Internet XP055746580.

Anonymous, "Printing Inks & OPV's" (brochure), Apr. 1, 2020, Internet, https://www.micropowders.com/Files/brochures/PrintingInks.pdf, Internet XP055746567.

Anonymous, "Specialty fine powders and exfoliants", Apr. 1, 2019, Internet, https://www.cerasuniversales.com/assets/Marcas-Ceras-Universales.pdf, Internet XP055746565.

Anonymous, "Wax Additives for Seed Coatings and Agrochemicals (NatureFine R331)", Application Bulletin, Sep. 1, 2019, Internet, http://www.micropowders.com/67.199.103.45/Files/brochures/SeedCoatingsBulletin2015.pdf, Internet XP055746575.

International Search Report (with partial translation) and Written Opinion dated Sep. 20, 2021, issued in corresponding International Patent Application No. PCT/EP2021/066663.

International Preliminary Report on Patentability dated Jul. 12, 2022, issued in corresponding International Patent Application No. PCT/EP2021/066663.

Fig. 1: Gloss [ ] of flexographic printing ink 1 using the tested micronizates
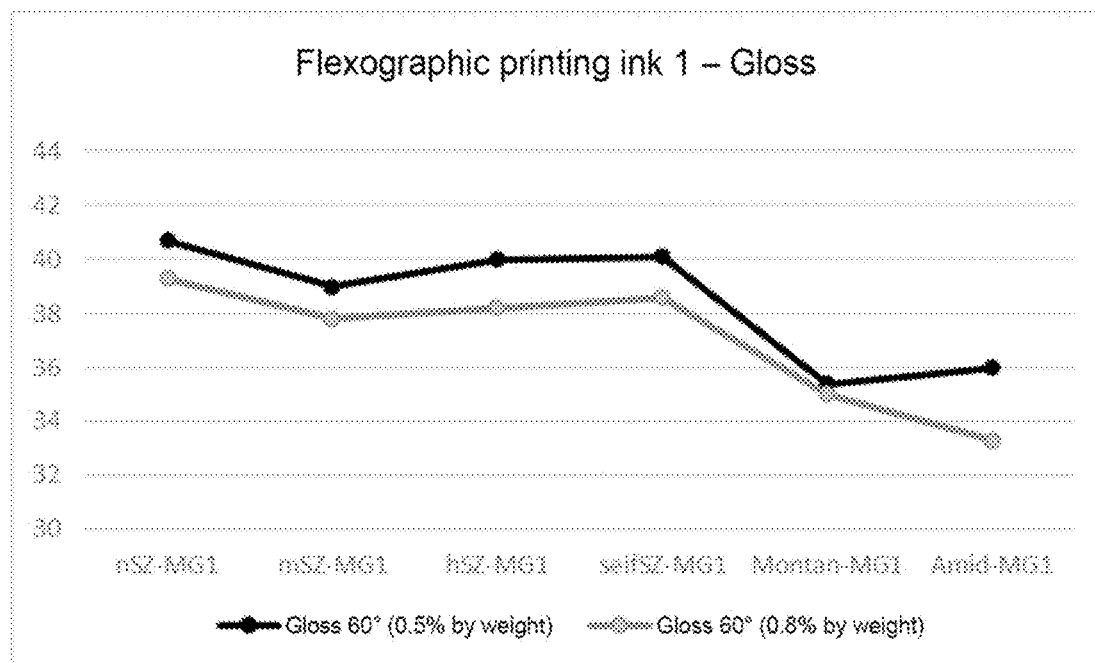
Fig. 2: Gloss [ ] of flexographic printing ink 2 using the tested MWAs
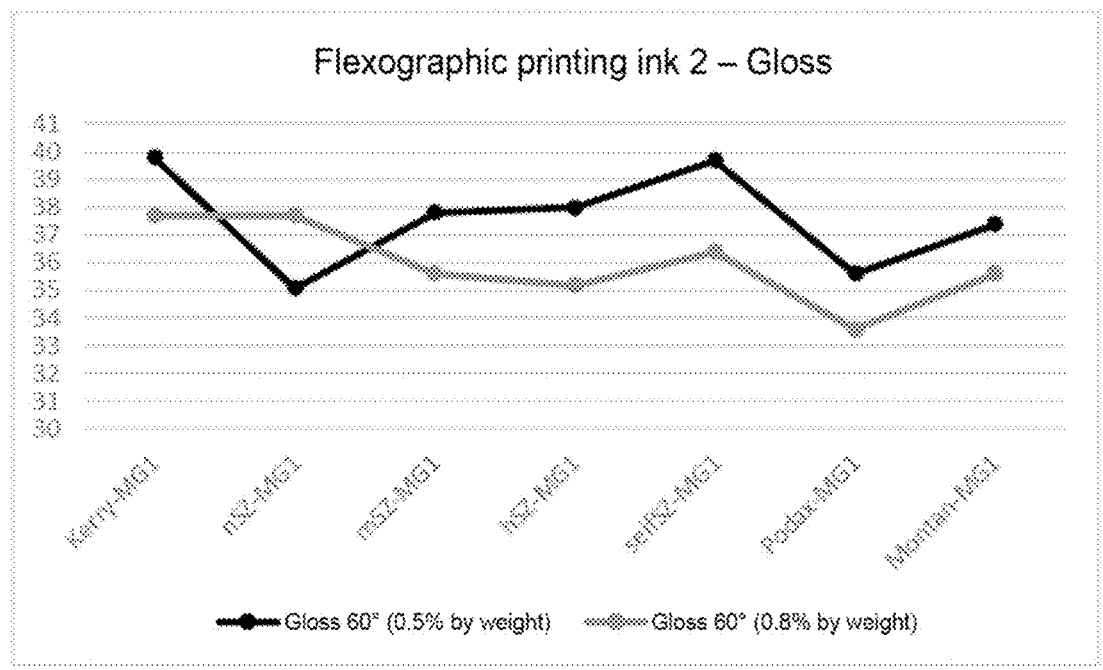

Fig. 3: Sliding friction [ ] of flexographic printing ink 1 using the tested MWAs
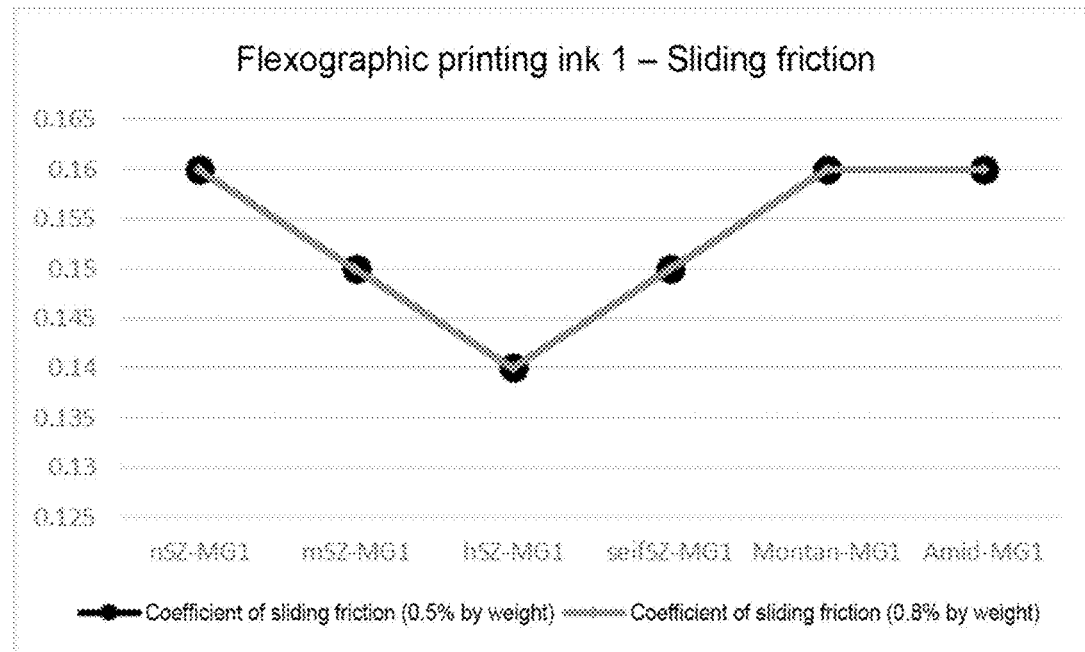
(The coefficients of sliding friction of the ink containing 0.5% by weight are identical to those of the ink with 0.8% by weight of micronizate, and so the curves are superposed)
Fig. 4: Sliding friction [ ] of flexographic printing ink 2 using the tested MWAs
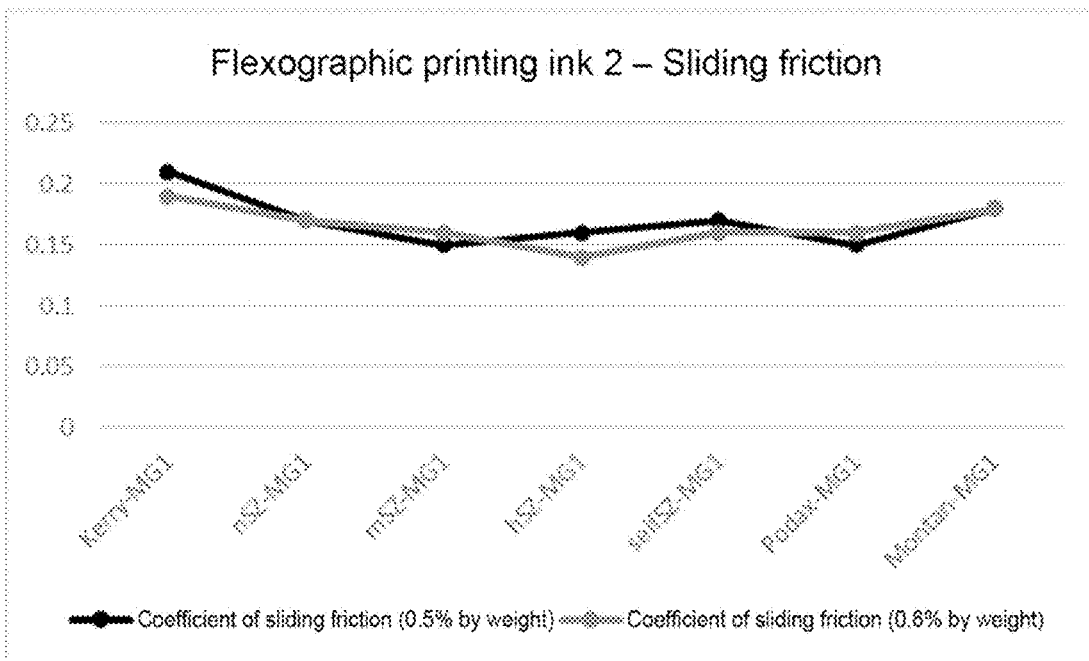

Fig. 5: Scrub resistance [ ] (lower color attrition) of an offset printing ink after addition of various MWAs
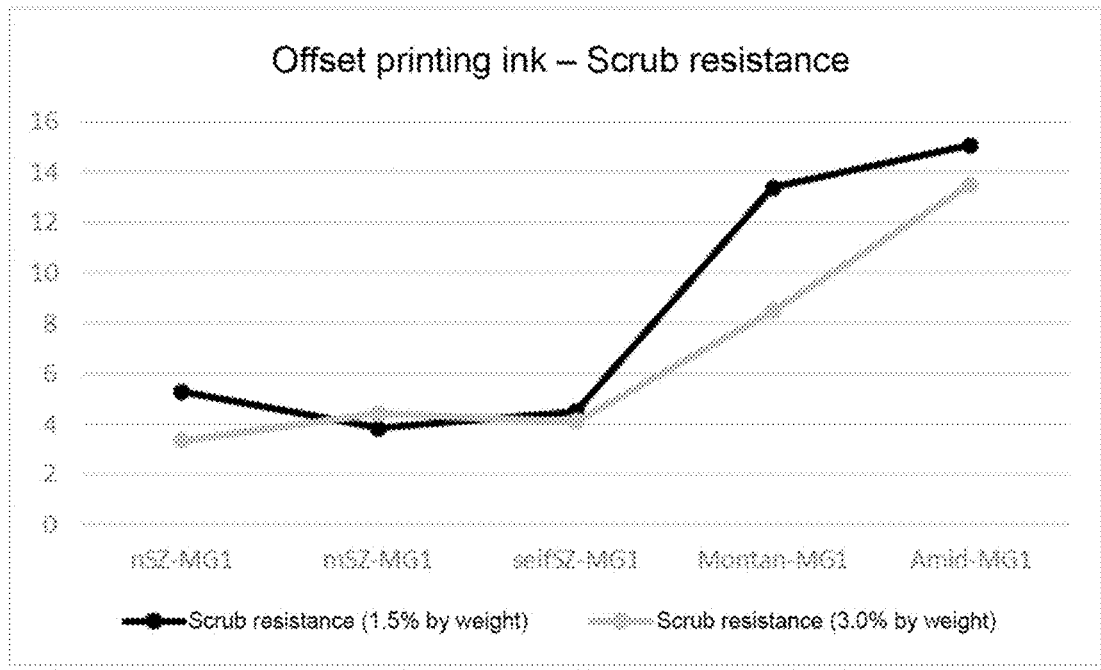
Fig. 6: Scrub resistance [ ] (lower color attrition) of an offset printing ink after addition of various MWAs
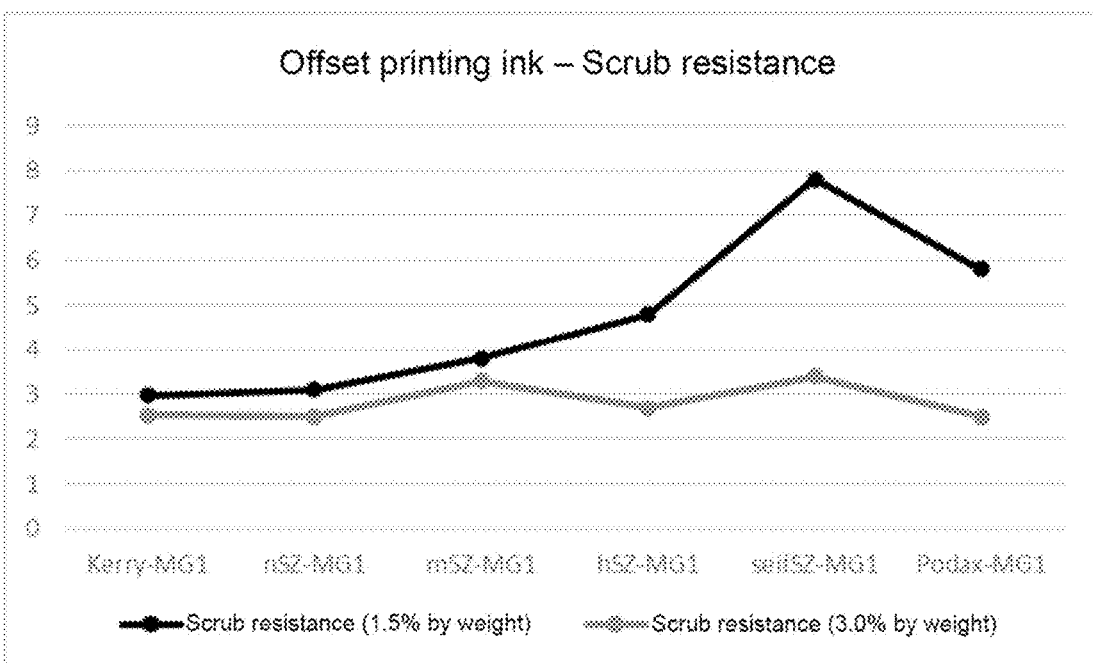

Fig. 7: Sliding friction [ ] of the 1K PUR paint using the tested MWAs with a particle size of 12 μm
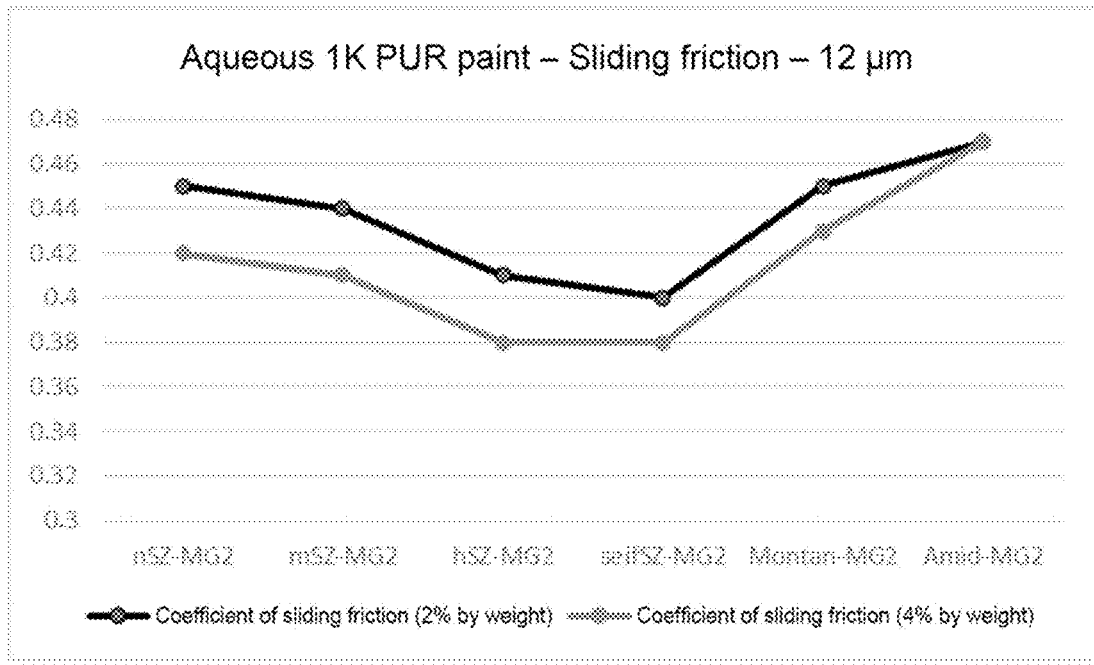
Fig. 8: Sliding friction [ ] of the 1K PUR paint using the tested MWAs with a particle size of 8 μm
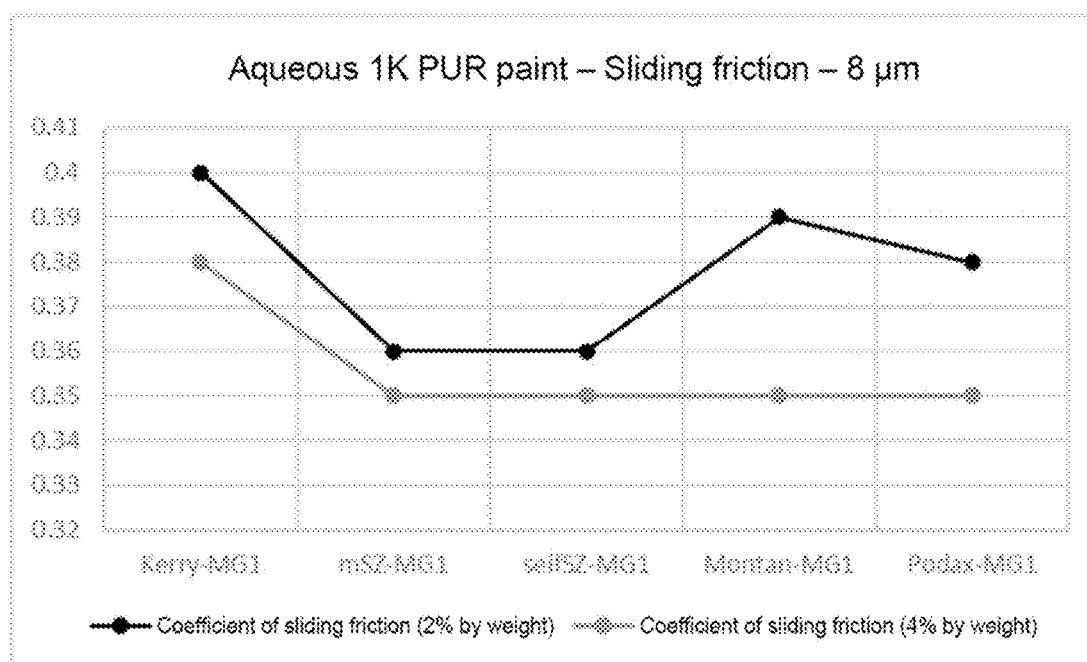

Fig. 9: Flatting effect [ ] in the 1K PUR paint (indicated by a relatively low gloss value)
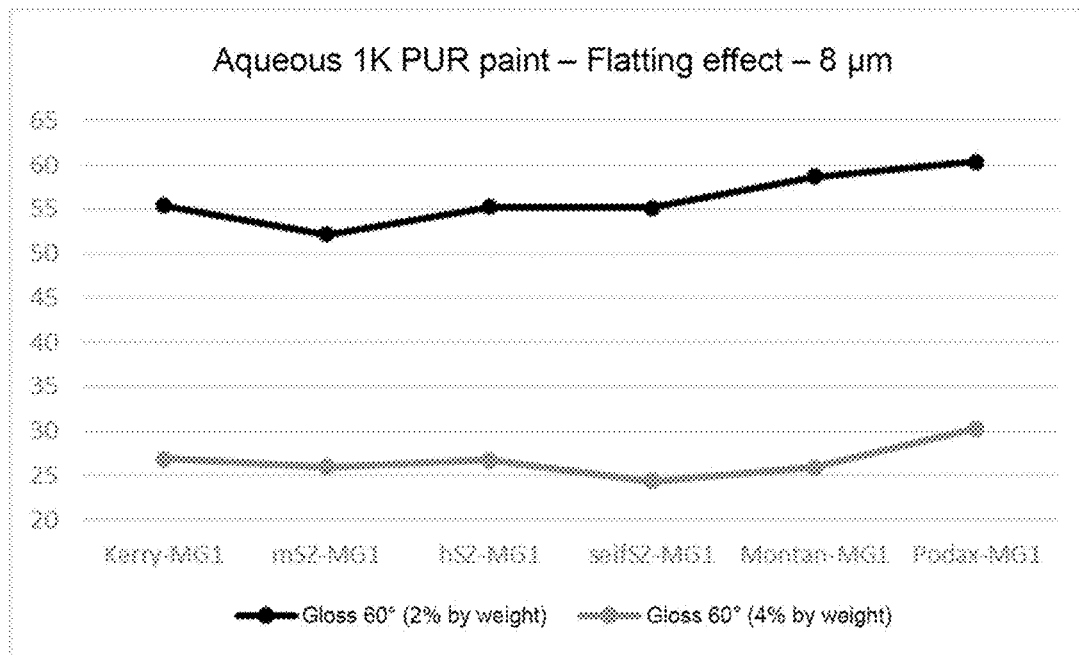
Fig. 10: Scratch resistance [N] of the 1K PUR paint (indicated by a high measurement)
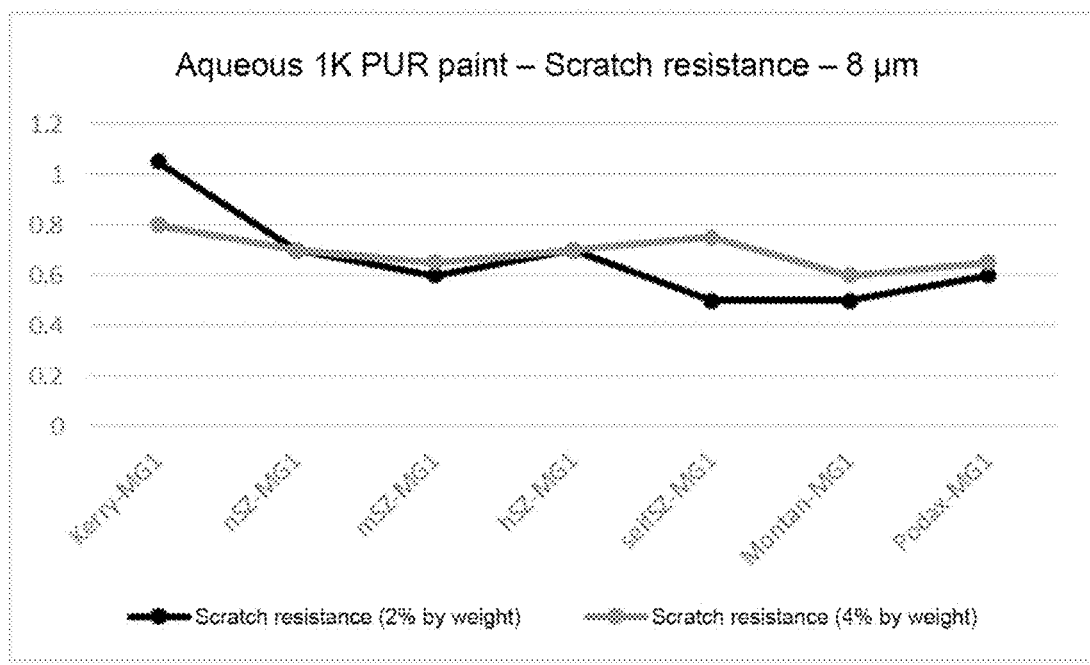

Fig. 11: : Flatting action [ ] in the 2K PUR paint (indicated by a relatively low gloss value)
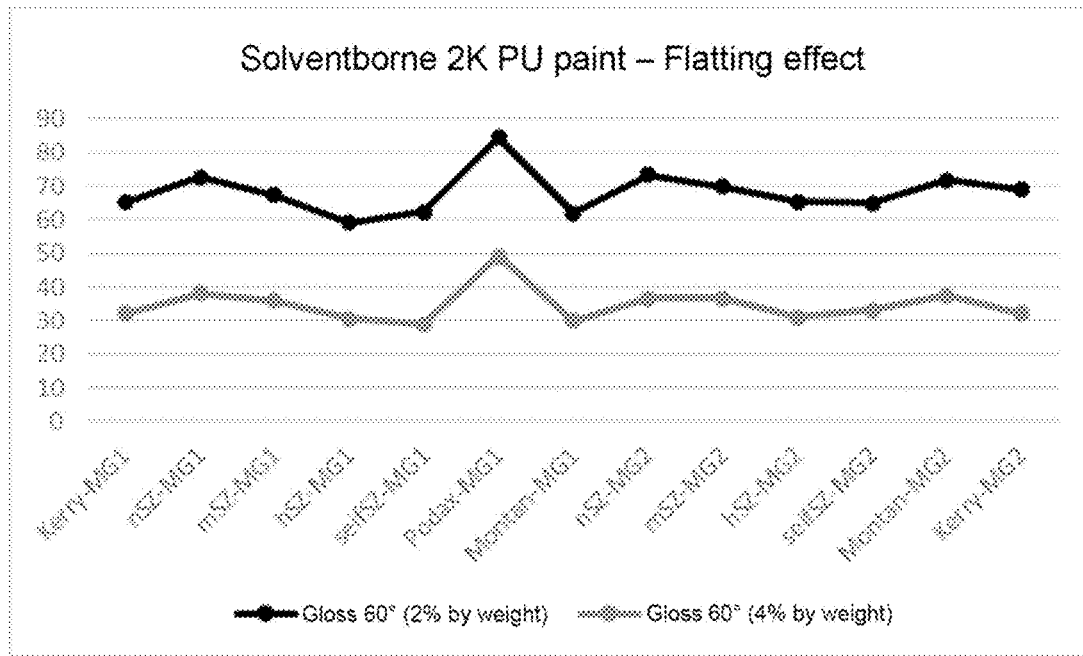
Fig. 12: : Sliding friction [ ] of the 2K PUR paint (indicated by a relatively low coefficient of sliding friction)
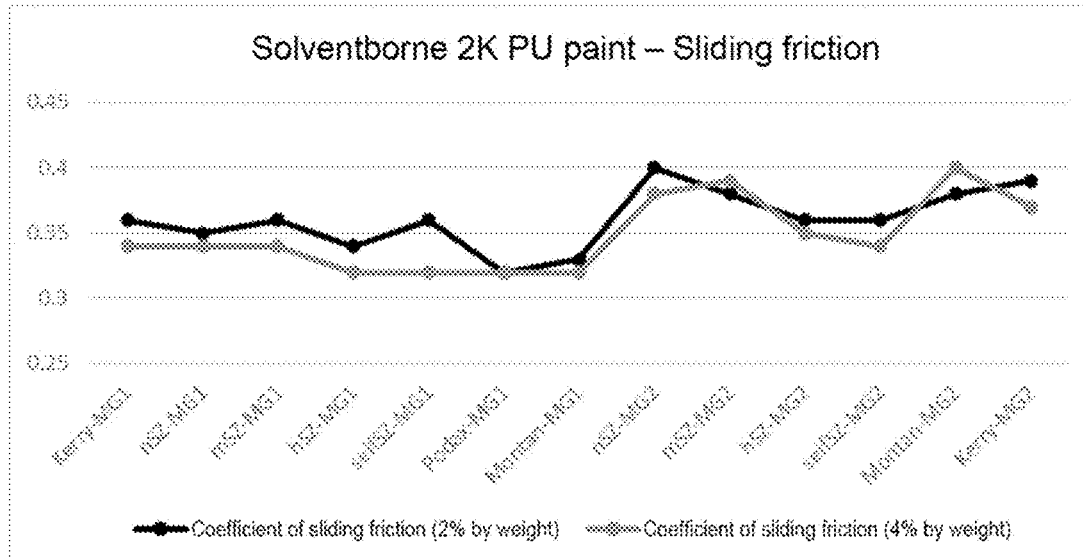

Fig. 13: Scratch resistance [N] of the 2K PUR paint (indicated by a high measurement)
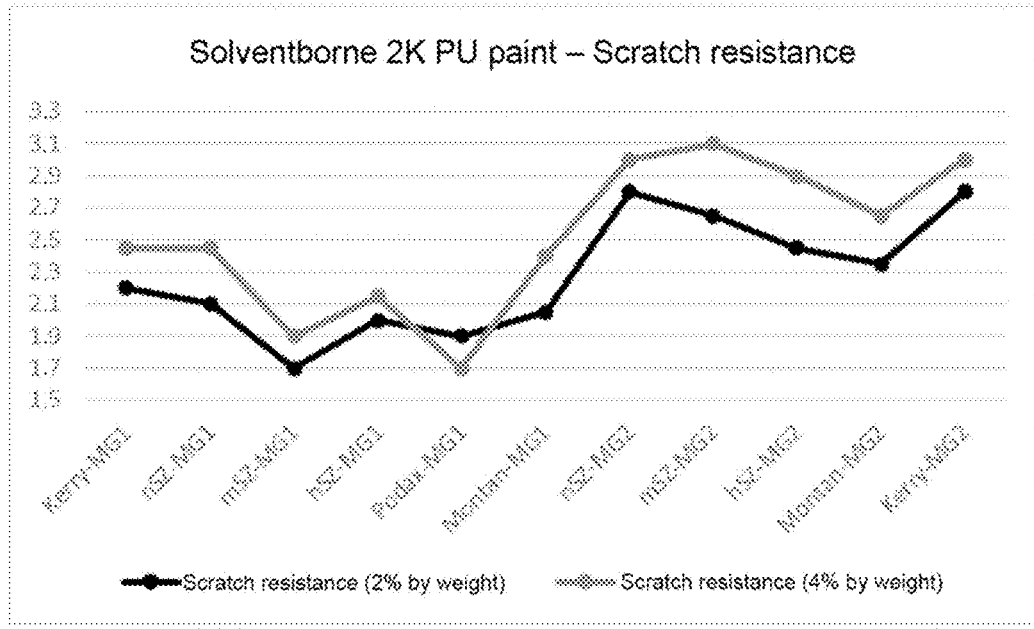
Fig. 14: Iodine color number [mg/100ml] of the micronized wax additives used (lower values indicate a light color)
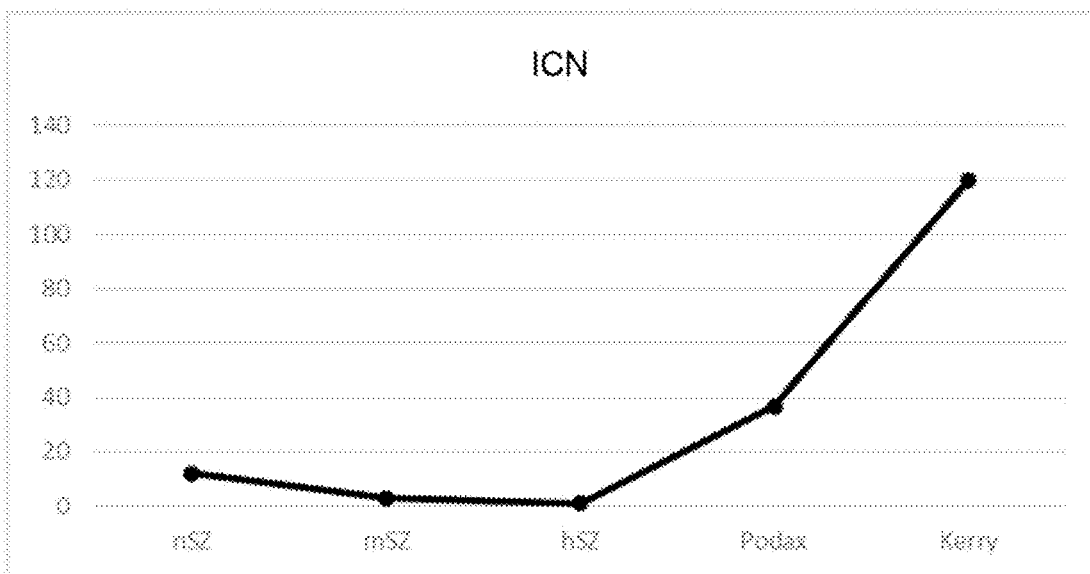

BIO-BASED ADDITIVES BASED ON MICRONIZED RICE BRAN WAX

The invention relates to micronized rice bran wax oxidates, to micronized wax additives based thereon, especially for printing inks, paints and coatings, to the production thereof and to the use thereof.

Micronized wax additives (MWAs) are employed, for example, in printing inks, paints and coatings in amounts between 0.5% and 5.0% by weight, in order to impart particular properties thereto or to improve them. Such properties are, for example, gloss or flatting, scratch resistance, scrub resistance, sliding friction and tactile properties. Micronized wax additives have the advantage over nonmicronized wax additives that they can be added either directly or in the form of a dispersion produced by the cold route.

Micronized wax additives refer to additives that contain or consist of waxes and have a volume-average particle size ($d_{50}$) of between 1 and 50 µm. Typically, the micronized wax additives are produced using waxes on a fossil or partly fossil raw material basis, for example montan waxes, polyolefin waxes, Fischer-Tropsch waxes, amide waxes or mixtures of these waxes. As well as waxes, micronized wax additives may contain further constituents. As further constituents, micronized wax additives may contain, for example, synthetic polymers (e.g. PTFE, polyethylene, polypropylene), biopolymers (e.g. sugars), inorganic compounds (e.g. diamond dust) and grinding aids (e.g. polyols).

There are in principle two methods for the production of micronized waxes. The first method is a spraying process in which a hot wax melt is pushed through a nozzle, and the wax powder thus obtained, if required, is subjected to a classifying process.

The second method is a grinding process, wherein waxes in pellet, flake or powder form are micronized by means of specific grinding equipment, e.g. jet mills or mechanical mills with integrated classifying.

Micronized waxes from both production methods are used in printing inks, paints and coatings.

For use in printing inks, it is advantageous when wax additives of different polarity are available, since the printing inks and paints may be either solvent-based or water-based depending on the application.

The waxes used to date for the production of micronized wax additives are predominantly of fossil origin and, with the exception of the likewise fossil montan waxes, show only very low biodegradability, if any. For various reasons, there are barely any sustainable alternatives. Many natural waxes are soft, have high oil or resin contents and therefore either cannot be micronized at all (e.g. beeswax) or, as a micronized product, readily stick together again and form agglomerates under the slightest influence of heat or pressure, which then show only poor dispersibility. However, good dispersibility is required in order to assure stable distribution of a wax additive in paints or printing inks and to reduce the tendency of the ingredients to settle. In addition, agglomerates can lead to surface defects on painted or printed substrates.

As well as other waxes based on renewable raw materials, there has been some description of the use of nonmicronized rice bran wax in printing inks and electrophotographic toners (JP-A 2010-020304; 2010). Rice bran waxes consist mainly of monoesters of long-chain, saturated, unbranched monocarboxylic acids with long-chain, unbranched, aliphatic monoalcohols (also called "genuine esters" hereinafter). The acid component of the rice bran wax esters is predominantly behenic acid and lignoceric acid, with chain lengths C22 and C24, and the alcohol component of the rice bran wax esters has predominantly chain lengths C26, C28, C30, C32 and C34.

The content of wax esters in deoiled, crude or additionally refined rice bran wax is generally greater than 96% by weight. In nondeoiled rice bran wax, the content of wax esters, according to the content of the rice bran oil, may even be only 50% by weight. In addition, the wax may contain free fatty acids and further constituents such as phosphorus lipids and steryl esters. Further variable constituents of the rice bran wax that are to be regarded as "trace constituents" are the otherwise unspecified "dark substances", squalene and what is called the "gum content". These components usually lead to a product quality that varies in terms of color and employability and is difficult to reproduce.

A conventional technique for lightening the deoiled, crude rice bran waxes is considered to be classic bleaching with hydrogen peroxide. Hydrogen peroxide-bleached rice bran waxes are yellowish and correspond largely to the starting waxes in terms of their ester content and in terms of their acid number. Such types are predominantly supplied on the market as deoiled and refined rice bran waxes, but likewise show varying product quality since the trace constituents remain in the product.

Oxidation products of rice bran wax and the conversion products thereof are known from EP-A 2909273 from 2015. They are produced by oxidation with chromosulfuric acid. This can achieve acid waxes within a very high acid number range between 70 mg KOH/g and 160 mg KOH/g. These can subsequently be partly or fully saponified with a basic metal salt, or esterified with a mono- or polyvalent alcohol.

Oxidation of the rice wax with chromic acid results essentially in cleavage of the wax esters and in situ oxidation of the wax alcohols formed to give wax acids. The acid number level is a measure of the content of free wax acids. Typical conversions in such oxidations are in the range of 10-90% based on the ester groups. The natural waxes bleached in this way, in addition to the desired lightening, have a higher saponification number and acid number than the unbleached waxes. These waxes have to date not been provided in micronized form. The production method described affords liquid rice bran wax at reaction temperature, which solidifies after cooling to room temperature and is then supplied in the form of pellets or granules.

Micronized waxes based on nonoxidized rice bran waxes are commercially available as Micronized Rice Bran Wax from Podax and under the NatureFine R331 and Naturesoft 860R product names from Micropowders. These micronized products are based on unbleached or hydrogen peroxide-bleached but nonoxidized rice bran waxes, and are supplied, for example, as flatting agents for cosmetic applications and as additive in printing inks, paints and agrochemical coatings.

These products are characterized by a yellowish color, the extent of which is more or less marked depending on the product and is quantified by an iodine color number of greater than 15. Such an iodine color number has an unfavorable effect on the color fidelity and brightness of color-sensitive paints and printing inks and coatings.

Aqueous dispersions of these products are unavailable to date on the market.

A common factor in the products based on nonoxidized rice bran waxes is that they have a low polarity, since the bleaching does not result in oxidation of the functional groups, and hence in any significant increase in polarity. The polarity of a wax ester is influenced to a crucial degree both by the acid groups and by the OH groups. The salts of the acid that form through hydrolysis with a basic metal salt also contribute to polarity.

The polarity of a substance influences its dispersibility in the dispersion medium. In the case of paints and printing inks, this may consist of water, various nonpolar solvents, and binders and further constituents. An appropriate adjustment of the polarity of a wax additive with respect to the dispersion medium leads to elevated stability of the dispersion and enables reduced use of emulsifiers. This has an advantageous effect on the stability and coating quality of paints and printing inks.

There is therefore a great need for renewable and biodegradable components for sustainable printing inks, paints and coatings that can be readily micronized, do not have a tendency to form agglomerates and have variable polarity, in order to enable stable use in various dispersion media.

It has now been found that, surprisingly, oxidized rice bran waxes having variable polarity and derivatives thereof (referred to hereinafter as rice bran wax oxidates, RWOs) can be ground or sprayed efficiently to give micronized rice bran wax oxidates and micronized wax additives (MWAs) comprising rice bran wax oxidates, and as such impart advantageous properties to printing inks, paints and coatings.

The micronized rice bran wax oxidates can form stable dispersions in water and various solvents with low or zero use of emulsifiers and are suitable for adjustment of the gloss of a flexographic printing ink or for flatting of PUR paints or offset printing inks. Mention should additionally be made of improvement of scratch resistance of paints and of increasing the scrub resistance (characterized by reduced color abrasion) of printing inks, and of reducing the sliding friction and improving the tactile properties of printing inks, paints and coatings.

The invention therefore provides rice bran wax oxidates that have optionally been derivatized, having a volume-average particle size $d_{50}$ (determined to ISO 13320-1) of between 1 and 50 μm, preferably between 5 and 15 μm, more preferably of 7.0 and 13.0 μm, and micronized wax additives (MWAs) comprising rice bran wax oxidates and/or derivatized rice bran wax oxidates, having a volume-average particle size $d_{50}$ of between 1 and 50 μm, preferably between 5 and 15 μm, most preferably of 7.0 and 13.0 μm. Particle sizes between 7.0-9.5 μm are the most preferred since particle sizes exceeding 10 μm are unusable in many standard printing inks and thin-film paints because the particle size exceeds the wet film thickness here.

Rice bran wax oxidates that have been optionally derivatized are understood to mean rice bran wax oxidates that are either in the form of the free acid wax after oxidation or have been partly or fully derivatized in a subsequent step, and have additionally been micronized to a volume-average particle size $d_{50}$ (to ISO 13320-1) of not more than 50 μm.

A method suitable for derivatization is a method selected from the group comprising hydrolysis, alcoholysis, esterification, amidation, saponification, ethoxylation, anhydride formation and decarboxylation. If the derivatization method is a saponification, saponification is effected, for example, with a basic metal salt selected from the group consisting of metal hydroxides (e.g. NaOH, KOH, Ca(OH)2 and Zn(OH)2, etc.), metal oxides (e.g. CaO, etc.), metal carbonates (e.g. Na2CO3, CaCO3, etc.), and aqueous alkalis (for example NaOH, KOH, etc.).

Preference is given to saponifying with metal hydroxides selected from the group consisting of NaOH, KOH, Ca(OH)2 and Zn(OH)2, or CaO, or metal carbonates selected from the group consisting of Na2CO3 and CaCO3, or with aqueous alkalis selected from the group consisting of NaOH and KOH, more preferably with calcium hydroxides, calcium oxides or calcium carbonates.

The optionally derivatized rice bran wax oxidates preferably have an acid number (to ISO 2114) of 1-140 mg KOH/g, preferably between 2 and 80 mg KOH/g, more preferably between 3 and 60 mg KOH/g.

In an alternative embodiment of the invention, the rice bran wax oxidates are produced for polar systems and accordingly have an acid number (to ISO 2114) of between 15 and 80 mg KOH/g, more preferably between 25 and 60 mg KOH/g, since the best results in polar dispersion media are achieved within this acid number range.

The optionally derivatized rice bran wax oxidates preferably have a saponification number (to ISO 3681) of between 30 and 185 mg KOH/g, preferably between 50 and 130 mg KOH/g, more preferably between 60 and 110 mg KOH/g.

The optionally derivatized rice bran wax oxidates preferably have a dropping point (to ISO 2176) of between 70 and 110° C.

In a preferred embodiment, the optionally derivatized rice bran wax oxidates have a density between 0.960 and 1.020 g/cm$^3$, preferably of 0.960-1.010 g/cm$^3$, more preferably of 0.960 to 1.000 g/cm$^3$.

The optionally derivatized rice bran wax oxidates are preferably oxidation products of rice bran wax with chromosulfuric acid and/or derivatization products thereof, preferably saponification products thereof, or a mixture of oxidation products of rice bran wax with chromosulfuric acid and/or derivatization products thereof, preferably saponification products thereof. More preferably, the optionally derivatized rice bran wax oxidates are produced with a mixture of chromium trioxide and sulfuric acid.

The invention additionally encompasses a micronized wax additive for printing inks, coatings and paints, comprising one or more optionally derivatized rice bran wax oxidates or consisting of one or more of these optionally derivatized rice bran wax oxidates.

The micronized wax additive preferably contains one or more optionally derivatized rice bran wax oxidates to an extent of 40-100% by weight, more preferably to an extent of 95-100% by weight, most preferably to an extent of 100% by weight, based on the total mass of the micronized wax additive.

The micronized wax additive preferably has a renewable carbon index (RCI; cf. table 1) of between 80% and 100%, more preferably of 100%.

The invention further provides a process for producing optionally derivatized rice bran wax oxidates or a micronized wax additive for printing inks, paints and coatings, having a volume-average particle size $d_{50}$ of between 1 and 50 μm, preferably between 5 and 15 μm, even more preferably between 7.0-13.0 μm, most preferably between 7.0-9.5 μm, by grinding on a mill, preferably on an impact plate mill or on an airjet mill, more preferably on an airjet mill.

In an alternative embodiment, the micronized wax additive is produced by grinding a mixture of unground raw materials comprising one or more unground, optionally derivatized rice bran wax oxidates on an impact plate mill or on an airjet mill, more preferably on an airjet mill.

Further unground raw materials may, for example, be synthetic polymers (e.g. PTFE, polyethylene, polypropylene), semisynthetic waxes (e.g. amide wax), biopolymers (e.g. sugars), inorganic compounds (e.g. diamond dust), grinding aids (e.g. polyols) and stabilizers.

The mixture of unground raw materials may be a melt mixture of the unground raw materials and in that case preferably takes the form of pellets, flakes or powder.

The mixture of unground raw materials may also be a physical mixture of the unground raw materials, in which case each individual component is preferably in the form of pellets, flakes or powder.

The physical mixture of unground raw materials may be introduced into the grinding space in already premixed form, or may be metered in separately, such that the physical mixture of unground raw materials is present in the grinding space.

In a further embodiment, the unground raw materials are first ground separately from one another. The micronized raw materials comprising optionally saponified rice bran wax oxidates are subsequently combined by physical mixing to give a micronized wax additive.

The invention further provides for the use of micronized wax additive comprising one or more optionally derivatized rice bran wax oxidates in printing inks, coatings or paints.

They are preferably used therein to guard against scratching and scrubbing, and as glossing agent or flatting agent for printing inks, coatings and paints.

The printing inks are preferably printing inks for relief printing (e.g. flexographic printing), planographic printing (e.g. offset printing), intaglio printing, porous printing (e.g. screen printing) or electronic printing methods (nonimpact printing, for example inkjet or laser printing).

The printing inks are preferably water-based, solvent-based, oil-based or what are called 100% systems (e.g. UV-curing or powder systems), for example offset printing inks or flexographic printing inks. Preference is given to oil-based offset printing inks or water-based flexographic printing inks.

The paints are preferably powder coatings or physically drying (water- or solvent-based) and/or reactive systems (e.g. 2K (2-component) systems, thermally crosslinking systems, UV systems). Particular preference is given to a water-based 1K (1-component) PUR paint system and a solvent-based 2K PUR paint system which is preferably used in wood paints.

The micronized wax additive is preferably used in an amount of 0.1-10.0% by weight, based on the total mass of the printing ink, coating or paint, more preferably in an amount of 0.2-4.0% by weight.

In one embodiment, the micronized wax additive is added directly to the printing ink, coatings or paint.

In an alternative embodiment, a dispersion of the micronized wax additive is added to the printing ink, coating or paint. The dispersant is preferably water.

In further alternative uses, the micronized wax additives are used as devolatilizing, leveling, sliding and/or dispersing auxiliaries for plastics or as hydrophobizing agent in plant protection preparations.

Substance Characterization

The standard methods listed in table 1 serve to determine the indices of natural and synthetic waxes and the indices of printing inks, paints and coatings. They are used for characterization of the micronized rice bran wax oxidates of the invention, starting materials thereof and comparative substances.

TABLE 1

Method overview

| | Method |
|---|---|
| Particle size determination [μm] | ISO 13320-1 |
| Density [g/cm$^3$] | ISO 1183-3 |
| Gloss 60° | The level of gloss was determined with a micro-TRI-gloss-μ gloss meter (BYK-Gardner GmbH). |
| Sliding friction | The coefficient of sliding friction was ascertained with a friction peel tester, model 225-1, from Thwing-Albert Instruments Company in accordance with ASTM method D2534. For this purpose, a glass plate coated with the paint to be tested was applied to the analysis instrument. Subsequently, a leather-covered metal slide (349 g) was placed onto the coated surface. The slide was subsequently pulled over the coated glass surface at constant speed (15 cm/min). The force required to pull the slide was measured. Since the coefficient of dynamic sliding friction was being ascertained, it was possible to neglect the initial force required to set the slide in motion. |
| Scrub resistance as minimum possible color abrasion | Scrub resistance was determined with a quadrant test setup. The opposing substrate used was unprinted paper, in order to simulate scrubbing in a paper stack. The scrubbing test was effected at a scrubbing stress of 0.48 N/cm$^2$ and a scrubbing speed of 15 cm/sec, after 50 strokes. The intensity of the color transferred to the opposing paper by the scrubbing was assessed: Δ E color difference according to DIN 6174 |
| Scratch resistance | In order to determine scratch resistance, the paint system to be tested was applied to a glass surface and tested with an Erichsen hardness testing pencil (318 type). Scratch resistance was determined in accordance with DIN ISO 1518 with the hardness testing pencil and a Bosch engraving tip having a diameter of 0.75 mm. The scratch should be about 10 mm long and leave a distinct mark in the paint. By adjusting the spring tension, it is possible to exert various forces on the paint surface. The maximum force that does not leave a distinct mark in the paint was determined for a wide variety of different paint formulations. The force is measured in steps of 0.1 N. |

TABLE 1-continued

Method overview

| | Method |
|---|---|
| Tactile properties | Wood paint surfaces were tested by touch in a closed box and graded in terms of sensory properties by the grades A, B and C, with A indicating positive sensory properties and C negative sensory properties. |
| Acid number (AN) [mg KOH/g] | ISO 2114 |
| Saponification number (SN) [mg KOH/g] | ISO 3681 |
| Dropping point (DP) [° C.] | ISO 2176 |
| Needle penetration value (NPN) [mm$^{-1}$] | DIN 51579 |
| Viscosity (Vis) [mPas] | DIN 53019 determined at 100° C., unless stated otherwise |
| Hydroxyl number (OHN) [mg KOH/g] | DGF M-IV 6 |
| Iodine color number (ICN) [mg/100 ml] | DIN 6162 |
| Thermogravimetric analysis (TGA) [% by wt.] | DIN 51006 From 25 to 300° C. at 5 K/min, then 30 min at 300° C. Measurement of the loss of mass on attainment of 300° C. and after 30 min at 300° C. |
| Renewable Carbon Index | Renewable Carbon Index (RCI) describes the proportion of carbon atoms from renewable raw materials in an organic compound or mixture and is calculated by the following formula: $$RCI\,(\%) = \frac{\sum_{i=1}^{n}(M_{total}*M_i*BCC_i*12/MW_i)}{\sum_{i=1}^{n}(M_{total}*M_i*BCC_i*12/MW_i) + \sum_{i=1}^{n}(M_{total}*M_i*FCC_i*12/MW_i)}$$ $M_{total}$ = total mass of the micronized wax additive $M_i$ = mass of the ith component of the micronized wax additive (in %) $BCC_i$ = number of bio-based carbon atoms in the ith component of the micronized wax additive $FCC_i$ = number of fossil carbon atoms in the ith component of the micronized wax additive $MW_i$ = molar mass of the ith component of the micronized wax additive Inorganic components and water are not taken into account in the calculation of RCI. |
| Throughput measurement | For the measurement of throughput in the laboratory mill, the throughput of the raw material under constant conditions was determined within a defined time, 30 min here. For this purpose, the micronizate obtained was weighed out on a balance and the throughput in grams/hour was documented. The throughput serves here as indicator of the grindability of the raw materials/rice bran wax oxidates used. |

The rice bran wax oxidates were ground on the following airjet mill:

TABLE 2

| Airjet mill | |
|---|---|
| Device: | Hosokawa Alpine 100 AFG/50ZPS/50 AFP multiprocess system |
| Fill volume: | about 0.8 dm³ |
| Grinding air rate: | about 80 m³/h |
| Classifier diameter: | 50 mm |
| Classifier speed: | max. 22000 min$^{-1}$ |

TABLE 2-continued

| Airjet mill | |
|---|---|
| Device: | Hosokawa Alpine 100 AFG/50ZPS/50 AFP multiprocess system |
| Classifier specifications: | Classifier wheel inserted with 8 paddles arranged in a spiral |

The optionally derivatized rice bran wax oxidates of the invention, as set out in table 3, were produced by grinding on the mill airjet mill detailed in table 2.

TABLE 3

Physicochemical properties of the inventive (inv.) micronized rice bran wax oxidates and of the MWAs used for comparative purposes (comp.)

| Sample | DP [° C.] | AN [mg KOH/g] | SN [mg KOH/g] | OHN [mg KOH/g] | ICN [mg/100 ml] | Density [g/cm³] | NPN [mm-1] | $d_{50}$ [µm] MG1 | $d_{90}$ [µm] MG1 | $d_{50}$ [µm] MG2 | $d_{90}$ [µm] MG2 | Throughput [g/h] MG1 (8 µm) | Throughput [g/h] MG2 (12 µm) |
|---|---|---|---|---|---|---|---|---|---|---|---|---|---|
| nSZ (inv.) | 78 | 19 | 89 | 5 | 12 | 0.98 | 1 | 8 | 14.6 | 12.4 | 24.7 | 1000 | 1916 |
| mSZ (inv.) | 77 | 52 | 113 | 4 | 3 | 0.99 | 3 | 7.5 | 19.3 | 11.9 | 23.4 | 1876 | 2462 |
| hSZ (inv.) | 76 | 128 | 168 | 5 | 1 | 1.00 | 3 | 7.4 | 13.3 | 11.9 | 21.4 | 1464 | 857 |
| seifSZ (inv.) | 108 | 15 | 79 | 12 | n.a. | 0.99 | 1 | 8.1 | 15.5 | 11.7 | 21.7 | 1594 | 984 |
| Montan wax (comp.) | 96 | 16 | 140 | 17 | n.a. | 1.01 | | 8.9 | 15.7 | 11.2 | 23.1 | n.a. | 173 |
| Amide wax (comp.) | 141.8 | 7.5 | 6 | — | 2.5 | 1.00 | 3 | 6.3 | 12.1 | 12.5 | 26.2 | n.a | n.a. |
| Podax BN-5 (comp.) | 78.9 | 12.6 | 88 | 19 | 36.8 | | 2 | 5.1 | 105 | — | — | — | — |
| Kerry-RBW (comp.) | 78 | 6.3 | 81.4 | 8.7 | 120 | 0.978 | 4 | 8.4 | 15.5 | 11.7 | 23.0 | 1583 | 1514 |

TABLE 4

Inventive MWAs used and MWAs serving as comparative substances and characterization thereof

| Sample | Manufacturer | Chem. composition | $d_{50}$ [µm] | RCI [%] | Polarity |
|---|---|---|---|---|---|
| nSZ-MG1 (inv.) | Clariant specimen | Rice bran wax oxidate | 8.0 | 100 | low |
| mSZ-MG1 (inv.) | Clariant specimen | Rice bran wax oxidate | 7.5 | 100 | moderate |
| hSZ-MG1 (inv.) | Clariant specimen | Rice bran wax oxidate | 7.4 | 100 | high |
| seifSZ-MG1 (inv.) | Clariant specimen | Partly saponified rice bran wax oxidate | 8.1 | 100 | moderate |
| nSZ-MG2 (inv.) | Clariant specimen | Rice bran wax oxidate | 12.4 | 100 | low |
| mSZ-MG2 (inv.) | Clariant specimen | Rice bran wax oxidate | 11.9 | 100 | moderate |
| hSZ-MG2 (inv.) | Clariant specimen | Rice bran wax oxidate | 11.9 | 100 | high |
| seifSZ-MG2 (comp.) | Clariant specimen | Partly saponified rice bran wax oxidate | 11.7 | 100 | moderate |
| Montan-MG1 (comp.) | Clariant Int. Ltd. | Partly saponified montan wax (Ceridust 5551) | 8.9 | 0 | low |
| Montan-MG2 (comp.) | Clariant specimen | Partly saponified montan wax | 11.2 | 0 | low |

TABLE 4-continued

Inventive MWAs used and MWAs serving as comparative substances and characterization thereof

| Sample | Manufacturer | Chem. composition | $d_{50}$ [μm] | RCI [%] | Polarity |
|---|---|---|---|---|---|
| Amid-MG1 (comp.) | Clariant Int. Ltd. | Amide wax, Ceridust 3910 | 6.3 | 94 | low |
| Amid-MG2 (comp.) | Clariant Int. Ltd | Amide wax, Licowax C Micro-powder PM | 11.3 | 94 | low |
| Podax- -MG1 (comp.) | Shanghai Tongs Science & Technology Co., Ltd. | Podax BN-5 Micronized Rice Bran | 8 | 100 | low |
| Kerry-MG1 (comp.) | Yihai Kerry (Panjin) Oil & Grains Ind. Co., Ltd | crude rice bran wax | 8.4 | 100 | low |
| Kerry-MG2 (comp.) | Yihai Kerry (Panjin) Oil & Grains Ind. Co., Ltd | crude rice bran wax | 11.7 | 100 | low |

Performance Tests:

EXAMPLE 1A: FLEXOGRAPHIC PRINTING INK 1

Components:

| | |
|---|---|
| A) Uni Q MB Blue 15.3 (12-111101-7.2260) (from Siegwerk) | 20.0% by weight |
| Dist. water | 10.0% by weight |
| B) Viacryl SC 175 W 40 WAIP (from Cytec) | 35.0% by weight |
| Dist. water | 35.0% by weight |
| | 100.0% by weight |
| Addition of MWA | 0.5% by weight/0.8% by weight |

Scrub test 50 strokes

EXAMPLE 1B: FLEXOGRAPHIC PRINTING INK 2

Components:

| | |
|---|---|
| A) HYDRO-X GLOSS Cyan wax-free (from Huber group) | 30.0% by weight |
| B) Viacryl SC 175 W 40 WAIP (from Cytec) | 20.0% by weight |
| Dist. water | 50.0% by weight |
| | 100.0% by weight |
| Addition of MWA | 0.5% by weight/0.8% by weight |

Unusual Feature:

Scrub Test with 100 Strokes

The basic scrub resistance of the printing ink is higher. In order to see differences, the number of strokes in the scrub test was therefore increased. The remaining conditions correspond to those that are also applicable to the flexographic printing ink 1.

Preparation:

Components A and B were each produced by diluting with distilled water. Subsequently, component A was initially charged in a large beaker, and component B was added gradually while stirring with a propeller stirrer. The mixture was homogenized with the propeller stirrer at 1200 rpm for at least 30 min.

The micronized wax additive was added to the printing ink base produced in this way in a concentration of 0.5% by weight or 0.8% by weight. The micronized wax additives were metered in gradually at 500 rpm in a dissolver, and then incorporated into the printing ink at 2000 rpm for 20 min.

Proofing was effected after at least 24 h (without foam) by full-area application of a wet film thickness of 6 μm to paper of the Algro Finess 80 g/m² quality. The proof strips were tested after a drying time of 48 h.

Testing of the Micronized Wax Additive of the Invention in an Aqueous Flexographic Printing Ink:

The effect of the micronized wax additive is quantified via the gloss, coefficient of sliding friction and scrub resistance of the above-specified guide formulation. In flexographic printing inks, a high value for gloss is desirable. In the case of the coefficient of sliding friction and relative scrub resistance, defined as color abrasion, lower values are desirable in flexographic printing inks.

TABLE 5

Performance data of flexographic printing inks 1 and 2

| Sample used | Ink used | Amount used [% by wt.] | Gloss 60° [ ] | Coefficient of sliding friction (rel.) [ ] | Scrub resistance (Δ E, rel.) [ ] |
|---|---|---|---|---|---|
| nSZ-MG1 (inv. 1) | Flexographic printing ink 1 | 0.5 | 40.7 | 0.16 | 3.30 |
| | | 0.8 | 39.3 | 0.16 | 3.15 |
| mSZ-MG1 (inv. 2) | Flexographic printing ink 1 | 0.5 | 39.0 | 0.15 | 3.02 |
| | | 0.8 | 37.8 | 0.15 | 3.11 |
| hSZ-MG1 (inv. 3) | Flexographic printing ink 1 | 0.5 | 40.0 | 0.14 | 2.88 |
| | | 0.8 | 38.2 | 0.14 | 3.03 |
| seifSZ-MG1 (inv. 4) | Flexographic printing ink 1 | 0.5 | 40.1 | 0.15 | 3.11 |
| | | 0.8 | 38.6 | 0.15 | 3.79 |
| Montan-MG1 (comp. 1) | Flexographic printing ink 1 | 0.5 | 35.4 | 0.16 | 3.26 |
| | | 0.8 | 35.0 | 0.16 | 3.39 |
| Amid-MG1 (comp. 2) | Flexographic printing ink 1 | 0.5 | 36.0 | 0.16 | 3.30 |
| | | 0.8 | 33.3 | 0.16 | 3.78 |
| Kerry-MG1 (comp. 4) | Flexographic printing ink 2 | 0.5 | 39.8 | 0.21 | 3.1 |
| | | 0.8 | 37.7 | 0.19 | 3.1 |
| nSZ-MG1 (inv. 5) | Flexographic printing ink 2 | 0.5 | 35.1 | 0.17 | 4.5 |
| | | 0.8 | 37.7 | 0.17 | 3.8 |

TABLE 5-continued

Performance data of flexographic printing inks 1 and 2

| Sample used | Ink used | Amount used [% by wt.] | Gloss 60° [ ] | Coefficient of sliding friction (rel.) [ ] | Scrub resistance (Δ E, rel.) [ ] |
|---|---|---|---|---|---|
| mSZ-MG1 (inv. 6) | Flexographic printing ink 2 | 0.5 | 37.8 | 0.15 | 3.35 |
| | | 0.8 | 35.6 | 0.16 | 2.82 |
| hSZ-MG1 (inv. 7) | Flexographic printing ink 2 | 0.5 | 38.0 | 0.16 | 3.1 |
| | | 0.8 | 35.2 | 0.14 | 3.02 |
| seifSZ-MG1 (inv. 8) | Flexographic printing ink 2 | 0.5 | 39.7 | 0.17 | 3.3 |
| | | 0.8 | 36.4 | 0.16 | 2.7 |
| Podax-MG1 (comp. 3) | Flexographic printing ink 2 | 0.5 | 35.6 | 0.15 | 3.2 |
| | | 0.8 | 33.6 | 0.16 | 3.1 |
| Montan-MG1 | Flexographic printing ink 2 | 0.5 | 37.4 | 0.18 | 3.14 |
| | | 0.8 | 35.7 | 0.18 | 3.05 |

The inventive examples from table 5 (inv. 1-4), by comparison with Montan-MG1 (comp. 1), Amid-MG1 (comp. 2), and Podax-MG1 (comp. 3), simultaneously show higher gloss and a comparable or low coefficient of sliding friction compared to the flexographic printing inks produced with the comparative waxes.

It can be inferred from FIGS. 1-4 that the rising polarity of the rice bran wax oxidates of the invention (table 5, inv. 1-8), in the series from low to higher polarity (inv. 1, 5<inv. 2, 6<inv. 3, 7~inv. 4, 8), has a favorable influence on the sliding friction of the flexographic printing ink used. Furthermore, the gloss desired in a flexographic printing ink is higher for all inventive rice bran wax oxidates than that of Podax-MG1 (comp. 3). Kerry-MG1 (comp. 4) does show somewhat higher gloss in the flexographic printing ink, but achieves distinctly poorer values for sliding friction, such that the rice bran wax oxidates of the invention, especially those having elevated polarity (inv. 3, inv. 4, inv. 7, inv. 8), have the best properties in the flexographic printing ink.

EXAMPLE 2: OFFSET PRINTING INK

Components:

| | |
|---|---|
| A) F&E-5004 Cyan wax-free eco ink (from Siegwerk) | 100% by weight |
| B) Addition of MWA to the offset ink base | 1.5% by weight/3.0% by weight |

The offset ink base was admixed with the MWA and homogenized in a Speedmixer at 3000 rpm for 5 min.

Proofing was effected on an offset laboratory printing press on offset paper at an application rate of 10.0±0.5 mg/m². Testing was effected after a drying time of 48 h in a climate-controlled room at 23° C. and a humidity of 50%.

Testing of the Micronized Wax Additive of the Invention in an Offset Printing Ink:

The effect of the micronized wax additive in offset printing inks is quantified via the coefficient of sliding friction and scrub resistance in the above-specified guide formulation. In the case of the coefficient of sliding friction and relative scrub resistance, defined as color abrasion, lower values are desirable. In addition, the micronized wax additive has an influence on gloss.

TABLE 6

Performance data of an offset printing ink

| Sample used | Amount used [% by wt.] | Gloss 60° [ ] | Coefficient of sliding friction (rel.) [ ] | Scrub resistance (Δ E, rel.) [ ] |
|---|---|---|---|---|
| nSZ-MG1 (inv. 9) | 1.5 | 40 | 0.39 | 5.31 |
| | 3.0 | 29.8 | 0.36 | 3.36 |
| mSZ-MG1 (inv. 10) | 1.5 | 39.8 | 0.54 | 3.86 |
| | 3.0 | 41.5 | 0.25 | 4.44 |
| seifSZ-MG1 (inv. 11) | 1.5 | 35.8 | 0.37 | 4.51 |
| | 3.0 | 41.8 | 0.34 | 4.12 |
| Montan-MG1 (comp. 5) | 1.5 | 43.1 | 0.57 | 13.40 |
| | 3.0 | 45.6 | 0.30 | 8.52 |
| Amid-MG1 (comp. 6) | 1.5 | 44.4 | 0.54 | 15.06 |
| | 3.0 | 44.2 | 0.3 | 14.51 |

The inventive examples (inv. 9/10/11) from table 6, by comparison with Montan-MG1 (comp. 5) or Amid-MG1 (comp. 6), simultaneously show reduced gloss, reduced relative coefficient of sliding friction, and better scrub resistance (lower color abrasion) of the offset printing ink produced.

It can be inferred from FIG. 5 that color abrasion is distinctly reduced compared to Montan-MG1 or Amid-MG1 when the rice bran waxes of the invention are used, and hence improved scrubbing protection of the printing ink on the paper surface is achieved.

TABLE 7

Performance data of an offset printing ink

| Sample used | Amount used [% by wt.] | Gloss 60° [ ] | Coefficient of sliding friction (rel.) [ ] | Scrub resistance (Δ E, rel.) [ ] |
|---|---|---|---|---|
| Kerry-MG1 (comp. 7) | 1.5 | 43.6 | 0.24 | 3.0 |
| | 3.0 | 38.4 | 0.17 | 2.5 |
| nSZ-MG1 (inv. 12) | 1.5 | 40.7 | 0.30 | 3.1 |
| | 3.0 | 39.7 | 0.21 | 2.5 |
| mSZ-MG1 (inv. 13) | 1.5 | 43.8 | 0.28 | 3.8 |
| | 3.0 | 42.0 | 0.23 | 3.3 |
| hSZ-MG1 (inv. 14) | 1.5 | 45.4 | 0.29 | 4.8 |
| | 3.0 | 43.7 | 0.29 | 2.7 |
| seifSZ-MG1 (inv. 15) | 1.5 | 43.4 | 0.3 | 7.8 |
| | 3.0 | 39.6 | 0.18 | 3.4 |
| Podax-MG1 (comp. 8) | 1.5 | 44.9 | 0.29 | 5.8 |
| | 3.0 | 38.5 | 0.16 | 2.5 |

FIG. 6 shows the comparison of the micronized rice bran waxes available on the market (comp. 7 and 8) and of the rice bran waxes of the invention. It is apparent that the less polarized rice bran wax oxidates of the invention (inv. 12-13), even in the case of a relatively small addition of 1.5% by weight of MWA, show a very good scrub resistance (low color abrasion) that can be achieved with Podax-MG1 (comp. 8) in the case of an added amount of 3% by weight. It is found here that a low polarity range is particularly suitable in the nonpolar offset printing ink.

Thus, a certain weight and cost benefit for the offset printing ink arises especially for the less polar rice bran wax oxidates.

Moreover, the rice bran wax oxidates of the invention are notable for their particularly light color (see ICN, table 3). The Kerry rice bran wax (comp. 7) is much darker.

EXAMPLE 3: AQUEOUS 1K PUR PAINT

Components:

| | |
|---|---|
| a) Bayhydrol UH 2342 | 91.0% by weight |
| b) Demineralized water | 3.1% by weight |
| c) Dipropylene glycol dimethyl ether | 3.1% by weight |
| d) BYK 028 | 0.8% by weight |
| e) BYK 347 | 0.5% by weight |
| f) Schwego Pur 6750 5% in water | 1.5% by weight |
| | 100.0% by weight |
| Addition of MWA | 2.0%/4.0% by weight |

For the production of the paint, components a) to f) were mixed using a propeller stirrer in the sequence specified. The stirring time was at least 20 min at about 1000 rpm.

Micronized wax additive was added to the paint produced in this way in the dissolver at 500 rpm in a concentration of 2% or 4%. The micronized wax additive was incorporated on a dissolver at 2000 rpm for 20 min.

For production of the samples, 60 μm wet films were knife-coated onto glass plates. The test specimens, for testing of tactile properties, were produced by a three-layer (cross-coating) brush application with intermediate sanding on untreated solid wood panels.

Testing was effected after 48 h in a climate-controlled room at 23° C. and a humidity of 50%.

Testing of the Micronized Wax Additive of the Invention in an Aqueous 1-Component PUR Paint:

The effect of the micronized wax additive is quantified via the coefficient of sliding friction and scrub resistance in the above-specified guide formulation using two different grinding grades. For coefficients of sliding friction, lower values are desirable in 1K PUR paints. For scratch resistance, high values are desirable in 1K PUR paints. In addition, MWA has an influence on the gloss of the 1K PUR paint.

EXAMPLE 3A: 1K PUR PAINT, MWA WITH $D_{50}$ OF ABOUT 12 μM

TABLE 8

1K PUR paint, MWA with $d_{50}$ of about 12 μm

| Sample used | Amount used [% by wt.] | Gloss 60° [ ] | Coefficient of sliding friction (rel.) [ ] | Scratch resistance [N] | Tactile properties [ ] |
|---|---|---|---|---|---|
| nSZ-MG2 | 2.0 | 73.5 | 0.45 | 0.5 | A |
| (inv. 16) | 4.0 | 37.1 | 0.42 | 0.5 | A |
| mSZ-MG2 | 2.0 | 66.2 | 0.44 | 0.6 | A |
| (inv. 17) | 4.0 | 29.9 | 0.41 | 0.6 | A |
| hSZ-MG2 | 2.0 | 68.4 | 0.41 | 0.5 | A |
| (inv. 18) | 4.0 | 32.7 | 0.38 | 0.5 | A |
| seifSZ-MG2 (inv. 19) | 2.0 | 63.5 | 0.40 | 0.5 | A |
| | 4.0 | 30.7 | 0.38 | 0.5 | A |
| Montan-MG2 (comp. 9) | 2.0 | 72.0 | 0.45 | 0.5 | B |
| | 4.0 | 38.3 | 0.43 | 0.5 | B |
| Amid-MG2 (comp. 10) | 2.0 | 71.4 | 0.47 | 0.4 | C |
| | 4.0 | 32.8 | 0.47 | 0.5 | C |

The inventive examples (inv. 16-19) from table 8, by comparison with the comparative substances (comp. 9 and 10), have a low coefficient of sliding friction and high scratch resistance. In addition, the inventive examples have an influence on the gloss of the 1K PUR paint.

Furthermore, the inventive examples achieved an improvement in tactile impression compared to the comparative substances. This is manifested in a sensorially softer and drier surface feel, which was classified as pleasantly smooth in the blind test.

EXAMPLE 3B: 1K PUR PAINT, MWA WITH $D_{50}$ OF ABOUT 8 μM

TABLE 9

1K PUR paint, MWA with $d_{50}$ of about 8 μm

| Sample used | Amount used [% by wt.] | Gloss 60° [ ] | Coefficient of sliding friction (rel.) [ ] | Scratch resistance [N] | Tactile properties [ ] |
|---|---|---|---|---|---|
| Kerry-MG1 | 2.0 | 55.4 | 0.4 | 1.05 | B |
| (comp. 11) | 4.0 | 26.9 | 0.38 | 0.8 | B |
| nSZ-MG1 | 2.0 | 59.4 | 0.4 | 0.7 | A |
| (inv. 20) | 4.0 | 29.8 | 0.38 | 0.7 | A |
| mSZ-MG1 | 2.0 | 52.2 | 0.36 | 0.6 | A |
| (inv. 21) | 4.0 | 26 | 0.35 | 0.65 | A |
| hSZ-MG1 | 2.0 | 55.3 | 0.39 | 0.7 | A |
| (inv. 22) | 4.0 | 26.7 | 0.35 | 0.7 | A |
| seifSZ-MG1 | 2.0 | 55.2 | 0.36 | 0.5 | A |
| (inv. 23) | 4.0 | 24.4 | 0.35 | 0.75 | A |
| Montan-MG1 | 2.0 | 58.7 | 0.39 | 0.5 | B |
| (comp. 12) | 4.0 | 25.9 | 0.35 | 0.6 | B |
| Podax-MG1 | 2.0 | 60.4 | 0.38 | 0.6 | B |
| (comp. 13) | 4.0 | 30.3 | 0.35 | 0.65 | B |

The performance data were additionally evaluated using graphs.

FIGS. 7 and 8 show the coefficients of sliding friction of two 1K PUR paint batches after addition of different micronized wax additives having different grinding grades.

Sliding friction is shown for two different grinding grades. It is found that the more polar rice bran wax oxidates mSZ, hSZ and seifSZ in the aqueous 1K PUR paint reduce sliding friction compared to Montan-MG2 (comp. 9), Amid-MG2 (comp. 10), and compared to Kerry-MG1 (comp. 11) and Podax-MG1 (comp. 13).

FIGS. 9 and 10 describe the flatting effect and scratch resistance of two 1K PUR paint batches after addition of different micronized wax additives having different grinding grades.

FIG. 9 shows that the inventive systems give slightly better flatting than Podax-MG1, provided that they are used with particle sizes around 8 μm. Moreover, particularly the polar rice bran wax oxidates impart high scratch resistance to the 1K PUR paint, which does not reach the scratch resistance of Kerry-MG1 (FIG. 10), but instead offers the advantage of distinctly lighter color (see ICN, table 3) over Kerry-MG1. This advantage may be of crucial importance for colorless paint applications in order to prevent discoloration of the paint coat.

In the sensory blind test undertaken, slightly improved tactile properties of the inventive systems compared to the comparative products were found. The tactile impression was somewhat smoother and drier in terms of feel.

EXAMPLE 4: SOLVENTBORNE 2K PUR PAINT

| 1st component: | |
|---|---|
| i) Desmophen 1300/75% in xylene | 32.0% by weight |
| ii) Walsroder Nitrocellulose E 510 in 20% ESO | 1.5% by weight |
| iii) Acronal 4 L 10% in ethyl acetate | 0.2% by weight |
| iv) Baysilone OL 17 10% in xylene | 0.2% by weight |
| v) ethyl acetate | 10.4% by weight |
| vi) n-butyl acetate | 11.0% by weight |
| vii) methoxypropyl acetate | 10.8% by weight |
| viii) xylene | 8.9% by weight |
| | 75.0% by weight |
| 2nd component: | |
| i) Desmodur IL BA | 14.2% by weight |
| ii) Desmodur L 75 | 9.4% by weight |
| iii) Xylene | 1.4% by weight |
| | 25.0% by weight |
| Addition of MWA to the paint base | 2.0% by weight/4.0% by weight |

The paint was produced using a propeller stirrer in the sequence specified.

The constituents of the first component were homogenized at around 1000 rpm in a suitable vessel with a propeller stirrer for several hours (until nitrocellulose dissolved). The constituents of the second component were separately homogenized in a suitable vessel with manual stirring. The paint is devolatilized in an ultrasound bath. The paint was produced by manual stirring of components 1 and 2 directly before the application of the paint to the substrates.

The micronized wax additive was added beforehand to component 1 (at 500 rpm), and incorporated in a dissolver at 2000 rpm for 20 min.

For production of the samples, 60 µm wet films were knife-coated onto glass plates. The test specimens, for testing of tactile properties, were produced by a three-layer brush application (cross-coating) with intermediate sanding on untreated solid wood panels.

Testing was effected after a drying time of 48 h in a climate-controlled room at 23° C. and a humidity of 50%.

Testing in a Solventborne 2-Component PUR Paint:

The effect of the MWA is quantified via the gloss, coefficient of sliding friction and scrub resistance in the above-specified guide formulation. For gloss performance and coefficient of sliding friction, comparatively low values are desirable in 2K PUR paints. For scratch resistance, high values are desirable in 2K PUR paints.

TABLE 10

Performance tests of 2K PUR paint, MWA

| Sample used | Amount used [% by wt.] | Gloss 60° [ ] | Coefficient of sliding friction (rel.) [ ] | Scratch resistance [N] | Tactile properties [ ] |
|---|---|---|---|---|---|
| Kerry-MG1 (comp. 14) | 2.0 | 65.2 | 0.36 | 2.2 | B |
| | 4.0 | 32.3 | 0.34 | 2.45 | B |
| nSZ-MG1 (inv. 24) | 2.0 | 72.8 | 0.35 | 2.1 | A |
| | 4.0 | 38.3 | 0.34 | 2.45 | A |
| mSZ-MG1 (inv. 25) | 2.0 | 67.4 | 0.36 | 1.7 | A |
| | 4.0 | 36.1 | 0.34 | 1.9 | A |
| hSZ-MG1 (inv. 26) | 2.0 | 59.3 | 0.34 | 2.0 | A |
| | 4.0 | 30.6 | 0.32 | 2.15 | A |
| seifSZ-MG1 (inv. 27) | 2.0 | 62.5 | 0.36 | 2.05 | A |
| | 4.0 | 28.9 | 0.32 | 2.55 | A |
| Montan-MG1 (comp. 15) | 2.0 | 61.9 | 0.33 | 2.05 | C |
| | 4.0 | 30 | 0.32 | 2.4 | C |
| Podax-MG1 (comp. 16) | 2.0 | 84.6 | 0.32 | 1.9 | B |
| | 4.0 | 49.1 | 0.32 | 1.7 | B |
| Kerry-MG2 (comp. 17) | 2.0 | 69.1 | 0.39 | 2.8 | B |
| | 4.0 | 32.1 | 0.37 | 3.0 | B |
| nSZ-MG2 (inv. 28) | 2.0 | 73.3 | 0.4 | 2.8 | A |
| | 4.0 | 36.6 | 0.38 | 3.0 | A |
| mSZ-MG2 (inv. 29) | 2.0 | 70 | 0.38 | 2.65 | A |
| | 4.0 | 36.7 | 0.39 | 3.1 | A |
| hSZ-MG2 (inv. 30) | 2.0 | 65.4 | 0.36 | 2.45 | A |
| | 4.0 | 31.2 | 0.35 | 2.9 | A |
| seifSZ-MG2 (inv. 31) | 2.0 | 64.9 | 0.36 | 0.85 | A |
| | 4.0 | 33.3 | 0.34 | 1.85 | A |
| Montan-MG2 (comp. 18) | 2.0 | 71.9 | 0.38 | 2.35 | C |
| | 4.0 | 37.6 | 0.4 | 2.65 | C |

The inventive examples (inv. 24-31) from table 10, compared to the comparative substances (comp. 14-18), show lower gloss or a flatting effect with a simultaneously low coefficient of sliding friction, high scratch resistance, and pleasant tactile properties which are important for wood paints.

In addition, the performance tests were evaluated using graphs.

FIG. 11 shows that the 2K PUR paints with added rice bran wax oxidates of the invention have lower gloss than the paints with added Podax-MG1, and Podax-MG1 has less of a flatting effect than the rest of the MWAs.

It is apparent from FIGS. 11 to 13, which show the gloss, sliding friction and scratch resistance of the 2K PUR paints with different added wax additives in the form of graphs, that Kerry-MG1 and Kerry-MG2 do have a somewhat stronger flatting effect than the rice bran wax oxidates of the invention, and are also comparable in terms of scratch resistance with the less polar rice bran waxes nSZ-MG1 or nSZ-MG2 (FIGS. 12 and 13), but it is apparent from FIG. 12 that they have somewhat poorer sliding friction by virtue of the higher coefficient of sliding friction. Moreover, Kerry-MG1 and Kerry-MG2 are distinctly darker (characterized by a distinctly higher iodine color number; see FIG. 14), and so the nonpolar rice bran wax oxidates in the nonpolar solvent-based 2K PUR paint have the best combination of desirable properties.

The invention claimed is:

1. Rice bran wax oxidates for wax additives, optionally derivatized by a method selected from the group comprising hydrolysis, alcoholysis, esterification, amidation, saponification, ethoxylation, anhydride formation and decarboxylation, having a volume-average particle size $d_{50}$ of between 1-50 µm, measured to ISO 13320-1 and an acid number between 1 and 140 mg KOH/g, measured to ISO 2114.

2. Rice bran wax oxidates as claimed in claim 1, wherein the rice bran wax oxidates further have a volume-average particle size $d_{50}$, measured to ISO 13320-1, of between 5-15 µm.

3. Rice bran wax oxidates as claimed in claim 1, wherein the derivatization is a saponification.

4. Rice bran wax oxidates as claimed in claim 1, wherein the acid number is between 15 and 140 mg KOH/g, measured to ISO 2114.

5. Rice bran wax oxidates as claimed in claim 1, wherein the rice bran wax oxidates further have a saponification number between 30 and 185 mg KOH/g, measured to ISO 3681.

6. Rice bran wax oxidates as claimed in claim 1, wherein the rice bran wax oxidates further have a dropping point between 70 and 110° C., measured to ISO 2176.

7. Rice bran wax oxidates as claimed in claim 1, wherein the rice bran wax oxidates have been produced with chromosulfuric acid.

8. A micronized wax additive for printing ink and paint systems, comprising one or more optionally derivatized rice bran wax oxidates as claimed in claim 1.

9. The micronized wax additive as claimed in claim 8, wherein the one or more optionally derivatized rice bran wax oxidates are present in an amount of 40-100% by weight, based on the total mass of the wax additive.

10. The micronized wax additive as claimed in claim 8, wherein the micronized wax additive has a renewable carbon index (RCI) of 80-100%.

11. A printing ink, coating, or paint comprising the micronized wax additive according to claim 8.

12. A printing ink according to claim 11, wherein the printing ink is an offset printing ink or a flexographic printing ink.

13. A printing ink, coating, or paint according to claim 11, wherein the micronized wax additive is used in an amount of 0.1-10.0% by weight, based on the total mass of the printing ink, coating or paint.

14. A printing ink, coating, or paint according to claim 11, wherein the micronized wax additive is added directly or as a dispersion to the printing ink, coating, or paint.

15. A paint according to claim 11, wherein the paint is a powder coating material, a wood paint, a 1K PUR paint system, or a 2K PUR paint system.

16. A devolatilizing, leveling, sliding, and/or dispersing auxiliary for plastics, or a hydrophobizing additive in plant protection preparations comprising the micronized wax additive according to claim 8.

17. A process for producing rice bran wax oxidates as claimed in claim 1, comprising grinding the components collectively in a mill down to a volume-average particle size $d_{50}$ of between 1 and 50 µm, measured to ISO 13320-1.

18. The process as claimed in claim 17, wherein the mill is an impact plate mill or an airjet mill.

\* \* \* \* \*